(12) United States Patent
Zhadanov et al.

(10) Patent No.: US 7,222,828 B2
(45) Date of Patent: May 29, 2007

(54) DEVICE FOR HOLDING SHOWER ACCESSORIES

(76) Inventors: Eli Zhadanov, 2944 W. 5th St., Apt 20 J, Brooklyn, NY (US) 11224; Sam Zhadanov, 2944 W. 5th St., Apt 20 J, Brooklyn, NY (US) 11224

(*) Notice: Subject to any disclaimer, the term of this patent is extended or adjusted under 35 U.S.C. 154(b) by 594 days.

(21) Appl. No.: 10/309,743

(22) Filed: Dec. 4, 2002

(65) Prior Publication Data

US 2005/0247840 A1    Nov. 10, 2005

(51) Int. Cl.
*A45D 41/14* (2006.01)
(52) U.S. Cl. .............................. 248/205.5; 248/206.2; 248/309.3
(58) Field of Classification Search ............ 248/316.7, 248/363, 362, 309.3, 205.5, 205.8, 467, 537, 248/206.2, 206.3
See application file for complete search history.

(56) References Cited

U.S. PATENT DOCUMENTS

| 4,093,165 | A | * | 6/1978 | Sussman | 248/106 |
| 4,668,059 | A | * | 5/1987 | Ohyama | 248/549 |
| 5,193,776 | A | * | 3/1993 | Nagai et al. | 188/67 |
| 5,263,593 | A | * | 11/1993 | Aida | 211/69.1 |
| 5,970,860 | A | * | 10/1999 | Yip | 99/510 |
| 6,045,111 | A | * | 4/2000 | Hsieh | 248/551 |
| 6,193,197 | B1 | * | 2/2001 | Lian | 248/206.2 |
| 6,478,271 | B1 | * | 11/2002 | Mulholland | 248/205.8 |

* cited by examiner

*Primary Examiner*—Ramon O Ramirez
(74) *Attorney, Agent, or Firm*—I Zborovsky

(57) ABSTRACT

A device for holding shower accessories and the like, comprising an elastic suction element, an actuating element adapted to actuate the suction element so as to attach the suction element to a supporting surface, a holding element connected with the suction element and formed to support a shower accessory and the like, the actuating element being turnable so that the suction element is actuated in response to turning of the actuating element.

9 Claims, 2 Drawing Sheets

DEVICE FOR HOLDING SHOWER ACCESSORIES

BACKGROUND OF THE INVENTION

The present invention relates to devices for holding shower accessories, such as for example hand-held showers, etc.

Devices of the above mentioned general type are known in the art. Some known devices include a so-called suction cup which is attachable under the action of suction to a supporting wall and carries a holding element which holds an accessory. It is believe that the existing devices of this type can be further improved.

SUMMARY OF THE INVENTION

Accordingly, it is an object of the present invention to provide a device for holding shower accessories, which is a further improvement of the existing devices.

In keeping with these objects and with others which will become apparent hereinafter, one feature of the present invention resides, briefly stated, in a device for holding shower accessories and the like, comprising an elastic suction element; an actuating element adapted to actuate said suction element so as to attach said suction element to a supporting surface; a holding element connected with said suction element and formed to support a shower accessory and the like, said actuating element being turnable so that said suction element is actuated in response to turning of said actuating element When the holding device is designed in accordance with the present invention it constitutes a further improvement of the existing device of this type.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
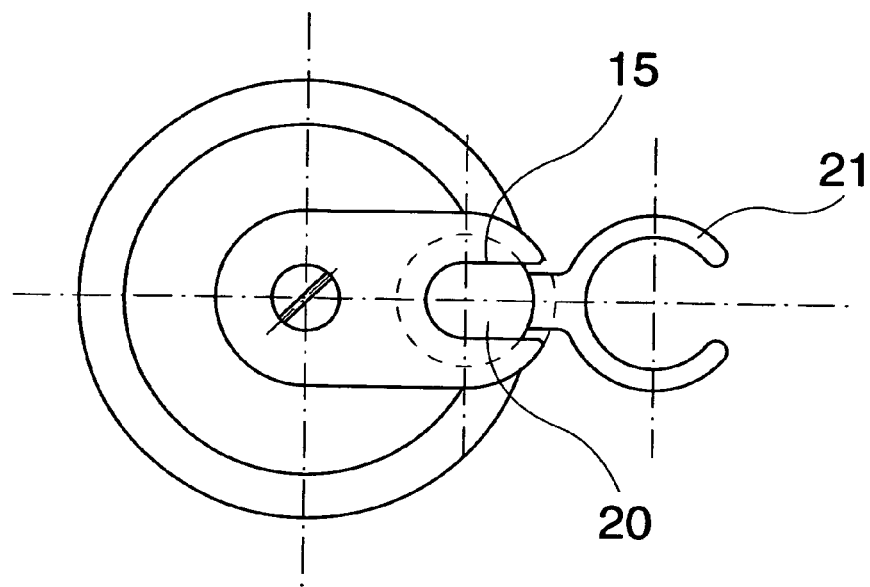
FIG. 2 is a plan view of the holding device shown in FIG. 1.

A device for holding shower accessories and the like has a suction element which is formed as a known suction cup and includes a casing 1 and an elastic element 2 locates in the interior of the casing 1 and formed as a diaphragm. An actuating member 3 has a lower end which is connected, preferably integrally with the elastic element 2. A pin 5 extends through a transverse opening 4 provided in the upper part of the actuating element 3.

The actuating element 3 is located inside a guiding element formed as a bushing 6 which in turn is located in a housing 9. The guiding element or bushing 6 has guiding slots 7 and 8 which can be formed for example as helical slots. The slots 7 and 8 merge into a depression 23 which performs the functions of fixation.

A cover 10 is connected with the housing 9 by a screw 11. It is fixed by interengaging formations 22 and flat surfaces 12 and 13 provided in the cover 10 and in the housing 9 correspondingly.

The cover 10 has an opening with a spherical surface 14 and a slot 15. The housing 9 has a throughgoing opening 16 and a blind hole 17 with a threaded plug 18. A rubber member 19 is located in the blind hole 17 and presses a spherical part 20 of a holder 21 to the spherical surface 14 of the cover 10. The holder 21 can be partially circular with an open end, so as to support a corresponding shower accessory.

The holder 21 has a hinge design. The plug 18 forms a pressing element and has a spherical end and the rubber member 19 (washer). The adjustment of the force is performed by turning of the plug 18, so as to clamp the spherical surface of the holder 21.

The holding device operates in the following manner.

Figure 1:
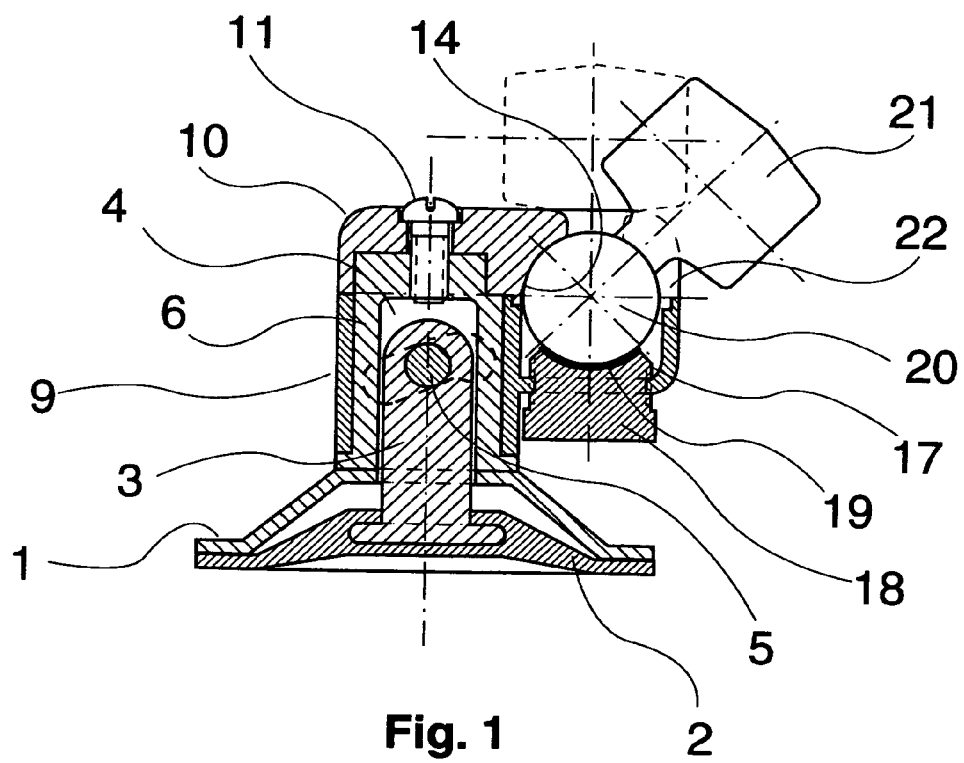
FIG. 1 is a view showing a cross-section of a holding device for holding shower accessories and the like in accordance with the present invention.
Figure 3:
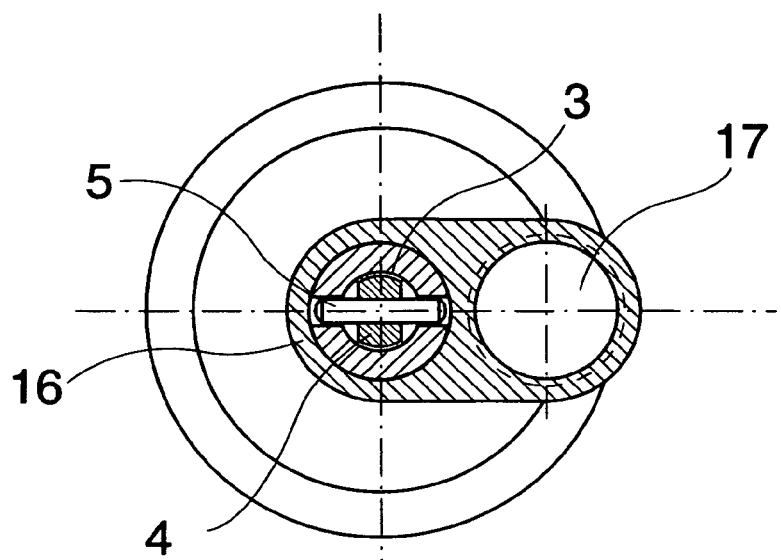
FIGS. 3 and 4 are views showing two partial transverse cross-section of the inventive holding device.
Figure 4:
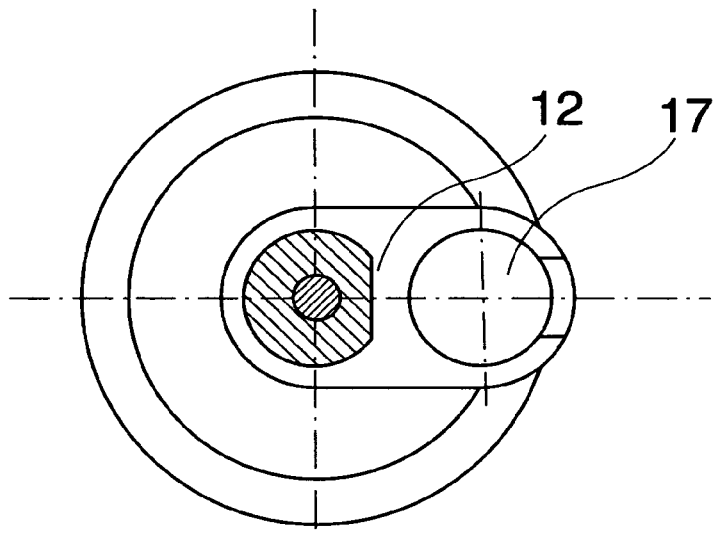
Figure 5:
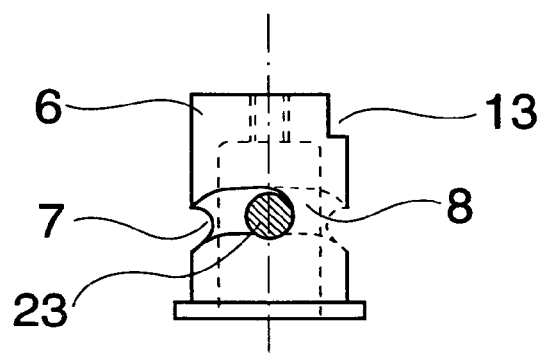
FIG. 5 is a view showing a guiding element of the inventive holding device.

The housing 9 is first turned around the actuating member 3 for example in a counterclockwise direction to its extreme position. Then the elastic element 2 is pressed against the supporting surface, for example a wall and the like, and the housing 9 is turned in an opposite direction, for example in a clockwise direction. Together with the housing 9, the guide or bushing 6 is also turned. As a result, the pin 5 which is located in the guiding slots 7 and 8 and is connected to the actuating member 3 is displaced in a vertical direction, as illustrated in FIG. 1 so as to pull the elastic element 2 and to create a vacuum between the elastic element 2 and the surface. The holding device is thereby reliably attached to the supporting surface. A corresponding shower accessory can be then introduced into an opening of the holding element 21, and the holding element 21 can be turned to any positions as shown for example in FIG. 1 in solid lines and in broken lines correspondingly.

When the device is designed in accordance with the present invention, the vacuum is created by the displacement of the pin along the helical slots. The fixation of the open position is performed by the depression 23 due to the vacuum pulling of the elastic element 2. The force applied during the process is eccentric and it prevents a self opening. The spherical turning device with the cover, the spherical opening and the pressing element allows regulation of a force in a spherical hinge created thereby.

It will be understood that each of the elements described above, or two or more together, may also find a useful application in other types of constructions differing from the types described above.

While the invention has been illustrated and described as embodied in device for holding shower accessories, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for holding shower accessories, comprising an elastic suction element; an actuating element adapted to actuate said suction element so as to attach said suction element to a supporting surface; a holding element formed to support a shower accessory; and a turnable guiding element in which said actuating element is displaceable, said guiding element being turnable so that said actuating element is displaced in response to turning of said guiding element and as a result said suction element is actuated in response to displacement of said actuating element by turning of said guiding element, wherein said guiding element is arranged inside and fixedly connected with said holding element.

2. A device for holding shower accessories, comprising an elastic suction element; an actuating element adapted to actuate said suction element so as to attach said suction element to a supporting surface; a holding element formed to support a shower accessory; and a turnable guiding element in which said actuating element is displaceable, said guiding element being turnable so that said actuating element is displaced in response to turning of said guiding element and as a result said suction element is actuated in response to displacement of said actuating element by turning of said guiding element, wherein said holding element is turnable; and further comprising means for fixing said holding element in each of a plurality of positions.

3. A device as defined in claim 2; and further comprising a housing, said holding element and said housing having cooperating spherical surfaces allowing turning of said holding element in said housing.

4. A device as defined in claim 3, wherein said fixing means include a threaded plug screwable into an opening in said housing.

5. A device for holding shower accessories, comprising an elastic suction element; an actuating element adapted to actuate said suction element so as to attach said suction element to a supporting surface; a holding element formed to support a shower accessory; and a turnable guiding element in which said actuating element is displaceable, said guiding element being turnable so that said actuating element is displaced in response to turning of said guiding element and as a result said suction element is actuated in response to displacement of said actuating element by turning of said guiding element, wherein said guiding element is formed as a bushing provided with an at least one curved slot, said actuating element being provided with a member movable in said at least one curve slot.

6. A device as defined in claim 5, wherein said guiding element has a second such curved slot, said member of said actuating element being movable in both said slots.

7. A device as defined in claim 6, wherein said guiding element has a depression provided between said two slots to provide a fixation of said member of said actuating element.

8. A device as defined in claim 5, wherein said at least one slot is formed as a helical slot.

9. A device for holding shower accessories, comprising an elastic suction element; an actuating element adapted to actuate said suction element so as to attach said suction element to a supporting surface; a holding element formed to support a shower accessory; and a turnable guiding element in which said actuating element is displaceable, said guiding element being turnable so that said said actuating element is displaced in response to turning of said guiding element and as a result suction element is actuated in response to displacement of said actuating element by turning of said guiding element, wherein said guiding element is arranged inside and fixedly connected with said holding element, while said holding element together with said guiding element are turnable relative to said actuating element so as to provide displacement of said actuating element and thereby actuation of said elastic element.

\* \* \* \* \*